US012664431B2

(12) United States Patent
Tartaglione et al.

(10) Patent No.: US 12,664,431 B2
(45) Date of Patent: Jun. 23, 2026

(54) METHOD AND APPARATUS FOR PRUNING NEURAL NETWORKS

(71) Applicants: SISVEL TECHNOLOGY S.R.L., None (IT); INSTITUT MINES TÉLÉCOM, Paris (FR)

(72) Inventors: Enzo Tartaglione, Nardo' (IT); Marco Grangetto, Pinerolo (IT); Francesco Odierna, Sarno (IT); Andrea Bragagnolo, Robassomero (IT); Attilio Fiandrotti, Turin (IT)

(73) Assignees: SISVEL TECHNOLOGY S.R.L., None (IT); INSTITUT MINES TÉLÉCOM, Paris (FR)

( * ) Notice: Subject to any disclaimer, the term of this patent is extended or adjusted under 35 U.S.C. 154(b) by 983 days.

(21) Appl. No.: 17/769,707

(22) PCT Filed: Oct. 6, 2020

(86) PCT No.: PCT/IB2020/059379
§ 371 (c)(1),
(2) Date: Apr. 15, 2022

(87) PCT Pub. No.: WO2021/074743
PCT Pub. Date: Apr. 22, 2021

(65) Prior Publication Data
US 2022/0284298 A1 Sep. 8, 2022

(30) Foreign Application Priority Data
Oct. 15, 2019 (IT) ........................ 102019000018821

(51) Int. Cl.
*G06N 3/082* (2023.01)

(52) U.S. Cl.
CPC .................................. *G06N 3/082* (2013.01)

(58) Field of Classification Search
CPC ...................................................... G06N 3/082
(Continued)

(56) References Cited

U.S. PATENT DOCUMENTS 6,581,046 B1 * 6/2003 Ahissar ................. G06N 3/049
706/15
12,271,812 B2 * 4/2025 Fiandrotti .............. G06N 3/084
(Continued)

FOREIGN PATENT DOCUMENTS

CN 107977703 A 5/2018
CN 109754063 A 5/2019

OTHER PUBLICATIONS

Molchanov, et al., "Importance estimation for neural network pruning", CVPR2019, 2019 (Year: 2019).*
(Continued)

*Primary Examiner* — Tsu-Chang Lee
(74) *Attorney, Agent, or Firm* — Maschoff Brennan

(57) ABSTRACT

The present invention relates to a method for pruning a neural network comprising a plurality of neurons, said method comprising: an initialization phase, wherein input information is fetched comprising at least parameters ($\{w_{ni}, b_{ni}\}$) related to said neural network and a dataset (D) representative of a task that said neural network has to deal with, wherein said parameters ($\{w_{ni}, b_{ni}\}$) comprising a weights vector ($w_{ni}$) and/or a bias ($b_{ni}$) related to at least one neuron of said plurality of neurons; a regularization phase, wherein said neural network is trained according to a training algorithm by using said dataset (D); a thresholding phase, wherein an element ($w_{nij}$) of said weights vector ($w_{ni}$) is put at zero when its absolute value is below a given threshold (T).

20 Claims, 7 Drawing Sheets

(58) Field of Classification Search
USPC ............................................................. 706/25
See application file for complete search history.

(56) References Cited

U.S. PATENT DOCUMENTS

| | | |
|---|---|---|
| 2017/0286830 A1 | 10/2017 | El-Yaniv et al. |
| 2018/0114114 A1 | 4/2018 | Molchanov et al. |
| 2019/0138882 A1 | 5/2019 | Choi et al. |

OTHER PUBLICATIONS

Wen, et al., "Learning structured sparsity in deep neural networks", 30th conference on Neural Information Processing Systems (NIPS 2016), Barcelona, Spain, 2016 (Year: 2016).*
International Search Report with Written Opinion from PCT Application No. PCT/IB2020/159379, Mar. 11, 2020.
Italian Search Report with Written Opinion from corresponding IT Application No. 201900018821, Jun. 22, 2020.
Tartaglione et al., "Learning Sparse Neural Networks via Sensitivity-Driven Regularization," Advances in Neural Information Processing Systems, Cornell University Library, Oct. 28, 2018, pp. 1-11.
Xiao et al., "Fashion-MNIST: a Novel Image Dataset for Benchmarking Machine Learning Algorithms," CoRR, vol. abs/1708. 07747, Aug. 25, 2017.
T. Gale et al., "The State of Sparsity in Deep Neural Networks", Feb. 25, 2019.

* cited by examiner

| Approach | Remaining parameters | | | | Total | $\frac{|\theta|}{|\theta \neq 0|}$ | [Neurons] | Top-1 Error |
|---|---|---|---|---|---|---|---|---|
| | Conv1 | Conv2 | FC1 | FC2 | | | | |
| Baseline | - | - | - | - | 430.5k | 1x | [25-50-500-10] | 8.1% |
| Tartaglione et al. [9] | 76.2% | 32.56% | 6.5% | 44.02% | 36.72k | 11.74x | [20-47-470-10] | 8.5% |
| Proposed (LB) | 85.6% | 29.26% | 3.05% | 47.9% | 22.35k | 19.26x | [20-49-438-10] | 8.44% |
| Proposed (local) | 88.4% | 25.41% | 3.08% | 57.68% | 22k | 19.91x | [20-50-460-10] | 8.43% |

600

620

610

METHOD AND APPARATUS FOR PRUNING NEURAL NETWORKS

The present invention relates to a method and an apparatus for pruning a neural network, according to the preamble of claim 1. In particular, the present invention describes a method and an apparatus for pruning neural networks so that they can be delivered over bandwidth-constrained channels, stored on capacity-limited media or deployed to resource constrained devices. As example, the present invention can be implemented in hardware optimized chipsets for Artificial Intelligence (AI) applications, i.e. neural networks applications, such as Kirin 980 CPU, A12 Bionic CPU and Snapdragon 845 chipset or the like, used in numerous smartphones. Nowadays Neural Networks (NNs) can solve extremely challenging tasks, because of many layers of connected neurons. Defining the complexity of a neural network to be the number of its learnable parameters, it is common to have architectures with tens of thousands of neurons and a complexity in the order of the hundreds of millions of parameters. For example, the 8-layers AlexNet memory footprint exceeds 240 MB of memory, whereas the 19-layers VGGNet memory footprint exceeds 500 MB.

Such complexity may limit the deployment of neural networks in industrial scenarios where resources such as the available memory for parameters representation, inference time or transmission bandwidth for sharing the network model are limited. An example of said industrial scenarios can be the deployment of neural networks for improved features performed by smartphone, such as camera scene and object recognition, AI-assisted night shooting, smart selfie blurs and augmented reality and so on so forth. The deployment of NNs on portable or embedded devices has become a growing concern.

Several different approaches were proposed in the literature to address the issues with memory requirements, model complexity and energy consumption of neural networks when deployed over resource constrained devices. These approaches can be categorized in three major groups: changing the model structure, parameters quantization and weights pruning.

Changing the model structure of a neural network allows to move from an architecture to another for example by forcing a precise neuronal connectivity, or by sharing weights, can reduce the number of parameters or the complexity of the network.

Quantization allows to reduce the bit representation for each of the parameters, therefore it is possible to reduce the memory needed to store and use the neural network.

Pruning techniques aim to learn sparse neural network topologies, i.e. a neural network with few non-zero parameters or with fewer neurons altogether.

Recently a technique has been proposed for example by E. Tartaglione, S. Lepsøy, A. Fiandrotti, and G. Francini, in the article "*Learning sparse neural networks via sensitivity-driven regularization*", published in Advances in Neural Information Processing Systems, 2018, pp. 3878-3888. The authors above have introduced a regularization term that selectively drives towards zero parameters of a neural network that are less sensitive, i.e. have little importance on the network output, and thus can be pruned without affecting the network performance. Such approach is effective at reducing the number of non-zero parameters in the network.

The technical solution described in the above-mentioned article has the following drawbacks.

A first drawback of such method is that it aims to minimize the number of non-zero parameters independently for each neuron, therefore the learned sparse topologies of the neural network usually lack a structure compromising the possibility to practically compress the neural network.

A further drawback of such method is that storing and accessing to randomly sparse structure of the resulting pruned neural network, provided by that method, implies significant penalties in memory access costs and processing overhead.

The present invention aims at solving these and other problems by providing a method and an apparatus for pruning neural networks, such that i) a very compact neural network with a structure is obtained and ii) with limited (or no) penalty in the learning task performance is entailed.

The present invention discloses an improved method and an apparatus for pruning neural networks that allows to jointly promote the parameters of a neuron towards zero, based on a neuronal sensitivity regularization function, achieving not only model compression but structural simplification in respect to techniques known in the prior art. In this way, the proposed invention can efficiently simplify neural networks for resource constrained devices. Furthermore, the framework disclosed can be for example used in conjunction with any standard for compression of neural networks for multimedia applications.

The invention will be described in detail hereinafter through non-limiting embodiments with reference to the attached figures, in which:

FIG. 1 represents an exemplificative neural network known in the art;

FIG. 2 exemplifies a pruning process, according to an embodiment of the present invention, with reference to the neural network of FIG. 1;

FIG. 3 schematically represents a block diagram illustrating apparatuses for pruning neural networks, according to an embodiment of the present invention;

Figure 1:
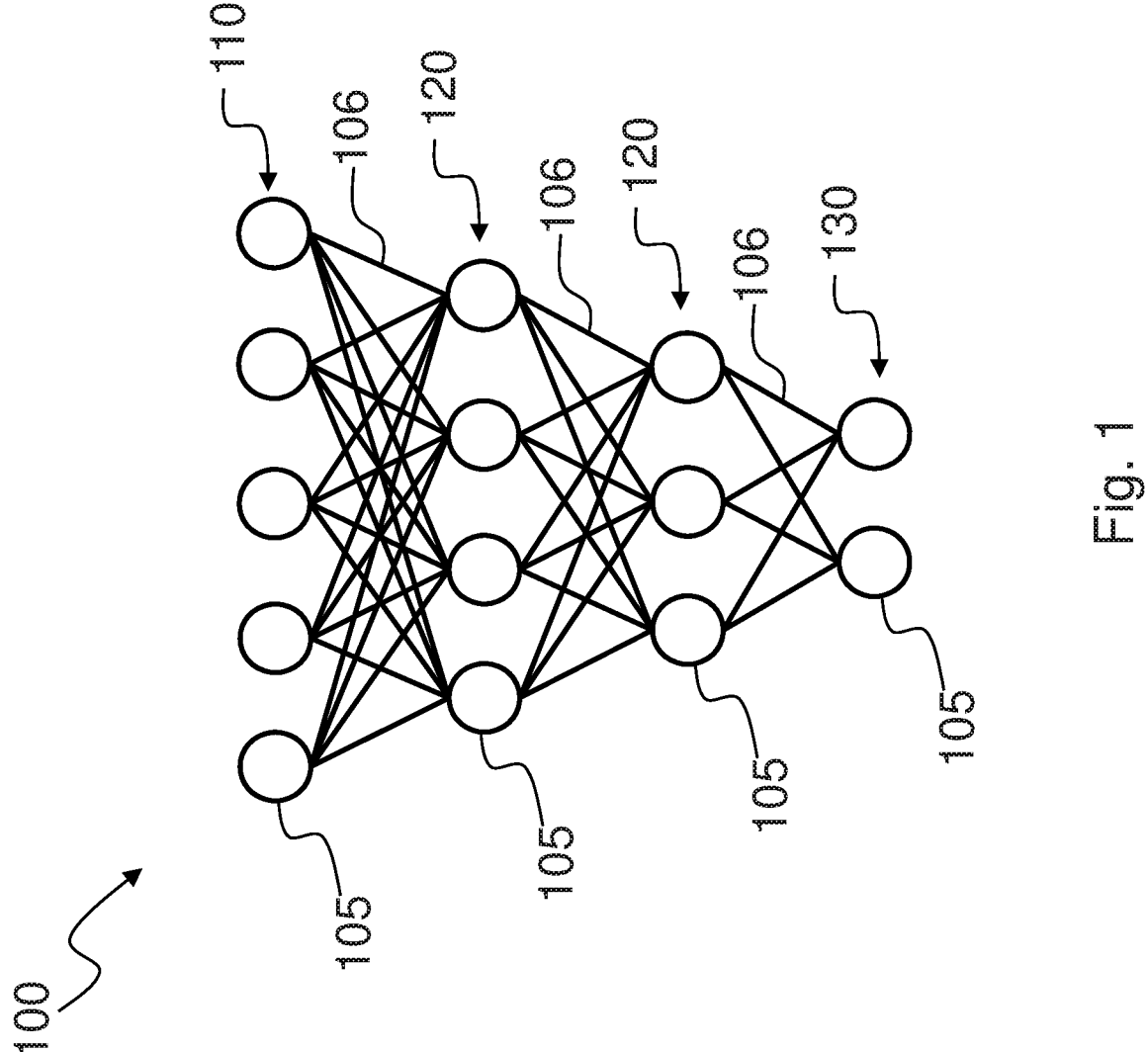
Figure 2:
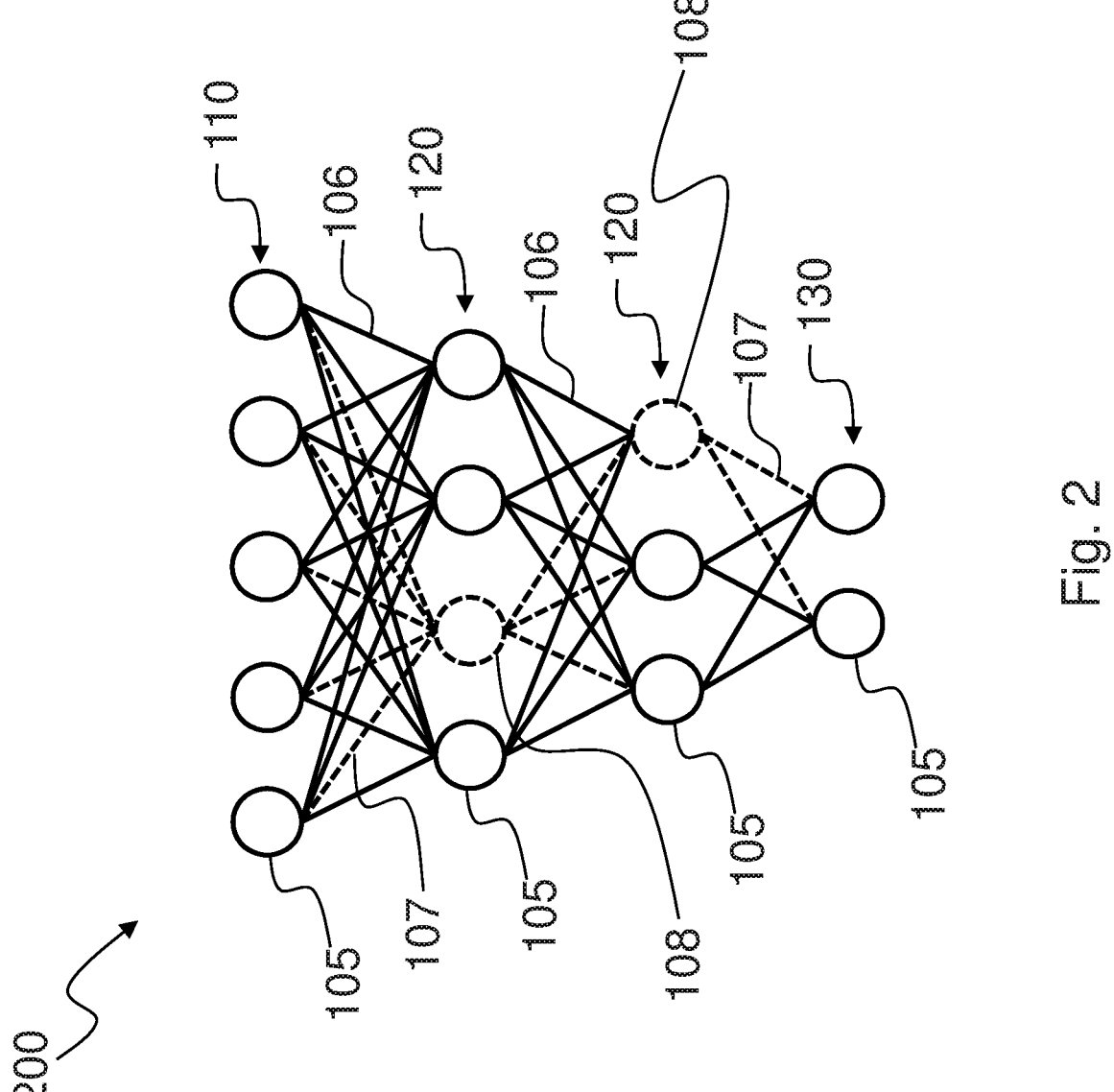
Figures 5, 6:
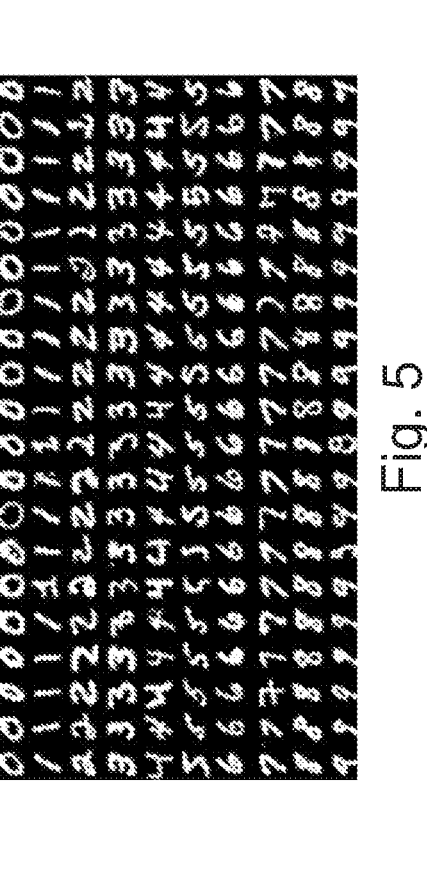
FIG. 5 shows some examples from the MNIST dataset for handwritten digit recognition.
Figure 7:
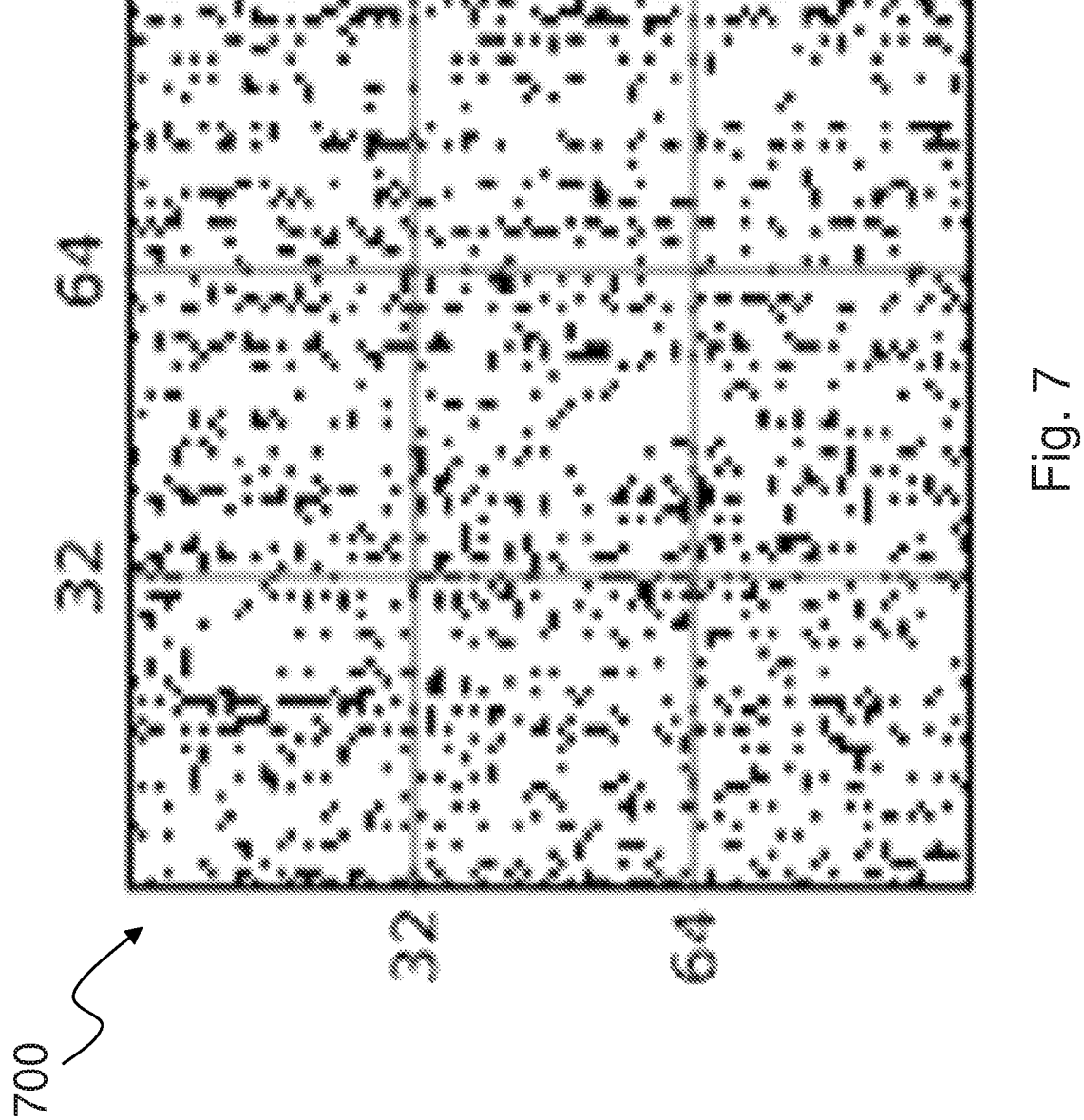
Figure 8:
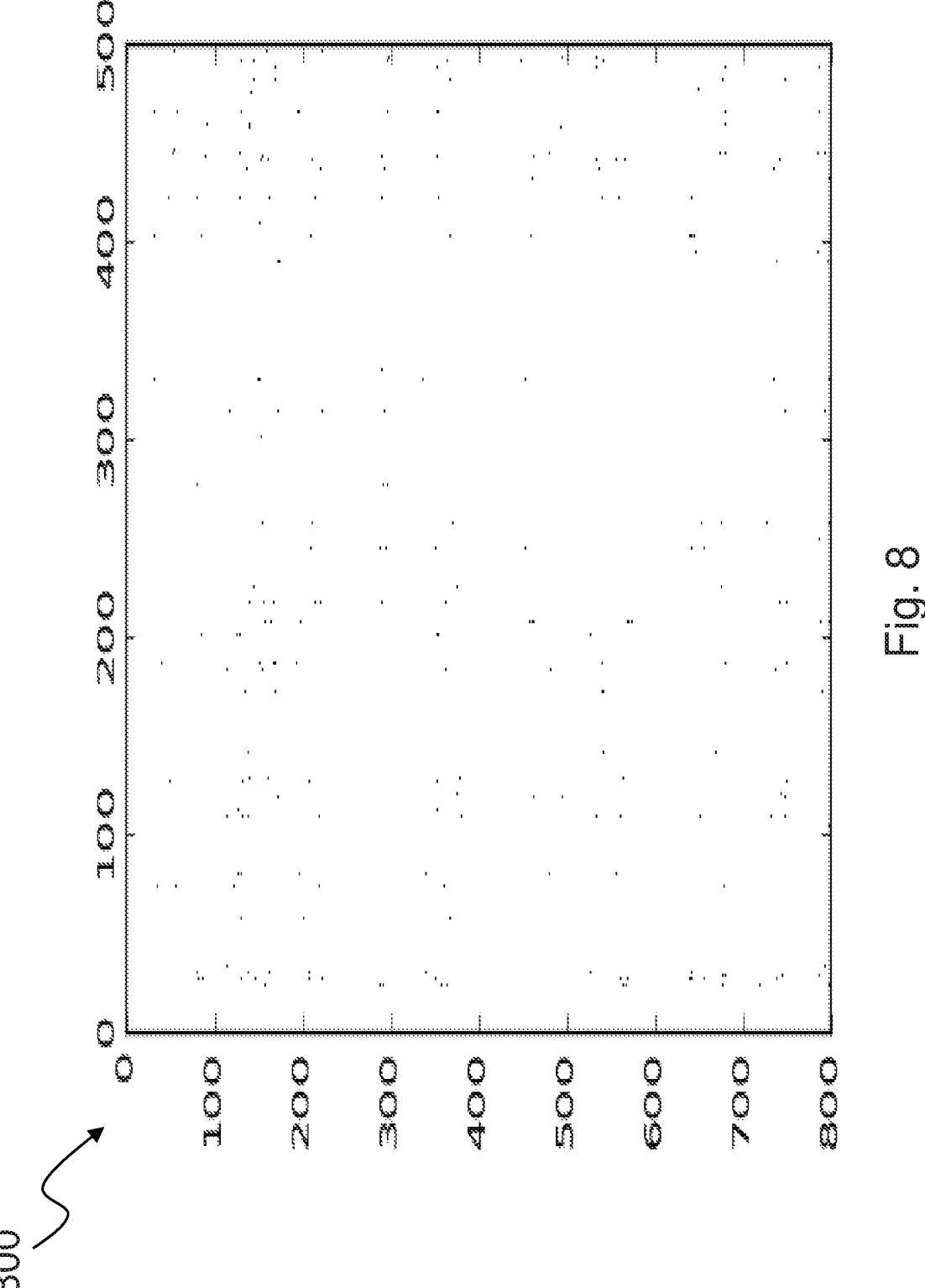

FIG. 6 summarizes some results provided by the Applicant according to an embodiment of the present invention;

FIG. 7 exemplifies a matrix representing some parameters of a neural network according to the state of the art, such as the neural network of FIG. 1;

FIG. 8 exemplifies a matrix representing some parameters of a neural network according to an embodiment of the present invention, such as the neural network of FIG. 2.

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

With reference to FIG. 1, a neural network 100 comprises a plurality of neurons 105, and can be represented by a weighted graph in which each neuron 105 is represented by a node of the graph and a connection 106, between two of said neurons 105, can be represented by an edge of the graph. The connection 106 can be characterized by a weight, i.e. a parameter of the neural network 100 that can be represented for example by a real number encoded as four or eight bytes according to the IEEE754 standard. The neurons 105 are organized in N layers 110, 120, 130, where N is an integer number. The topology of the graph characterizes the neural network 100, for example the neurons 105 belonging in two adjacent layers 110, 120, 130 can be fully connected, i.e. each neuron 105 of a layer 110, 120, 130 has a connection 106 to each neuron 105 of its adjacent layer 110, 120, 130, as shown in FIG. 1.

Considering n as an index labelling a layer of said neural network 100, the input layer 110 can be identified by n=0, while the output layer 130 can be identified by n=N. A hidden layer 120 can be identified with a value of the index n between 1 and N−1. Each of the n layers is composed by $X_n$ neurons 105, also known as filters or kernels in the case of convolutional layers. For the i-th neuron 105 of the n-th layer 110, 120, 130, labelled as $x_{ni}$, it is possible to define its output value $y_{ni}$, its input values vector $Y_{n-1}$, its weights vector $w_{ni}$ and its bias parameter $b_{ni}$.

Each neuron 105 has its own activation function $g_{ni}(\bullet)$ to be applied after some affine function $f_{ni}(\bullet)$ which can be a convolution, dot product, or any combination of them. The output of a neuron is given by the following relation $$y_{ni} = g_{ni}[f_{ni}(\{w_{ni}, b_{ni}\}; Y_{n-1})]. \tag{1}$$

A model M of said neural network 100 comprises the parameters $\{w_{ni}, b_{ni}\}$ related to the neural network 100, the activation function $g_{ni}$, the affine function $f_{ni}$ and the topology of the graph of the neural network 100. The weights which parametrize the connections 130 between two adjacent layers 110, 120, 130 can be represented as a matrix having $X_n \times X_{n-1}$ entries $w_{nij}$, where the indices i, j correspond respectively to the neuron 105 labelled as $x_{ni}$ of the n-th layer and to the neuron 105 labelled as $x_{(n-1)j}$ of the (n−1)-th layer. Whereas, the biases of the n-th layer 110, 120, 130 can be represented as a vector having $X_n$ entries. It is clear how the amount of the parameters $\{w_{ni}, b_{ni}\}$ increases linearly with growing of the number of neurons 105 and layers 110, 120, 130 of said neural network 100.

Before it can be deployed, the neural network 100 needs to be trained. Its training can be performed by means of a dataset D, representative of a task that the neural network 100 has to deal with, such as handwritten digits recognition, voice recognition, image recognition and so on so forth. Usually, said dataset D comprises a large number of examples, such as pairs $(d_k; v_k)$, each pair comprises an input value $d_k$ and its corresponding target value $v_k$. As example, in the case of handwritten digits, the input value $d_k$ can be a grayscale image of a handwritten digit where the luminosity of each pixel of the image is encoded as a number in the 0-255 range, while the target value $v_k$ can be the corresponding ASCII code index. As an example, FIG. 5 shows some images from the well-known MNIST dataset consisting in 60 k training plus 10 k test images of handwritten digits sized 28×28, grayscale. The dataset D is usually randomly partitioned in a first training set U and a first validation set V, so that the neural network 100 can be trained by using the information related to the first training set U to achieve some satisfying first performance level A over said first validation set V. The first performance level A can be defined by means of a set of values according to a predefined metric, for example the maximum error allowable for the neural network 100.

The training of the neural network 100 is usually performed by defining a loss function L for some given parameters $\{w_{ni}, b_{ni}\}$ of the model M. As an example, the loss function L can be defined by the following relation $$L = \tfrac{1}{2} \Sigma_k (Y_k - v_k)^2, \tag{2}$$

where k is the index running on the example pairs of the first training set U during a learning epoch t, $Y_k$ is the output obtained by the neural network 100 having $d_k$ as input value and $v_k$ is its corresponding target value of each example. The training of the neural network 100 is thus usually performed by minimizing the loss function L over the parameters $\{w_{ni}, b_{ni}\}$ of the model M by operating the well-known in the art Gradient Descent with error gradient backpropagation algorithm.

During the training procedure described above, the model M parameters $\{w_{ni}, b_{ni}\}$ evolve from learning epoch t to epoch t+1 according to the Gradient Descent update rule (3) such that the first performance level A is achieved.

$$w_{nij}^{t+1} = w_{nij}^t - \eta \frac{\partial L}{\partial w_{nij}^t}; \eta \in [0, +\infty), \tag{3}$$

As a result of the training procedure the parameters $\{w_{ni}, b_{ni}\}$ are trained.

As mentioned before, the amount of the parameters $\{w_{ni}, b_{ni}\}$ increases linearly with the number of neurons 105 and layers 110, 120, 130 of said neural network 100. Furthermore, the matrices which collect the weights vector $w_{ni}$ after the training procedure are usually dense, i.e. they have few zero entries, whereas after the pruning procedure according to the cited prior art said matrices are usually unstructured, i.e. they have non-zero entries randomly distributed. FIG. 7 shows an example of a matrix 700 having 96×96 entries representing the weights vector $w_{ni}$ of all neurons in a layer 110, 120, 130 arranged for example by rows, after the training and the pruning procedure according to the mentioned prior art, wherein black dots represent non-zero weights and white dots represent zero weights. The compression of these matrices is not effective because of the dense or unstructured pattern of the weights vector $w_{ni}$ after the training procedure, therefore it is difficult to operate with neural networks, such as said neural network 100, in the context of resource constrained device.

The proposed invention allows to efficiently simplify neural networks for resource constrained devices, also for the compression of neural networks for multimedia applications.

With reference to FIG. 2, a pruning process according to an embodiment of the present invention is described in reference to the neural network 100, in order to obtain a resulting pruned neural network 200.

The method for pruning neural networks described in the present invention allows to learn network topologies which are not only sparse but also with fewer neurons for each layer, or equivalently fewer filters for convolutional layers. Fewer neurons simplify the task of obtaining a compact representation of a network topology over memory constrained devices. As a further benefit, smaller and denser models may also speedup network execution thanks to better use of cache locality and memory access pattern.

According to the invention, an update rule to drive towards zero the parameters related to at least one less sensitive neuron 108 is performed. This allows, in a following step, to prune at least one less sensitive neuron 108, i.e. put at zero all its related parameters, such as its bias and all its weights, which can be represented by connections 107.

The resulting pruned neural network 200 has a reduced number of neurons 105 and corresponding connections 106, consequently the number of non-zero parameters $\{w_{ni},b_{ni}\}$ is reduced, allowing for example to represent them by means of smaller matrices, i.e. with a reduced number of rows or columns.

On the contrary, the method described by E. Tartaglione et al., in the article cited above, discloses a method to prune, i.e. to put at zero, only the weights $w_{nij}$ of the neural network 100, obtaining a reduced number of the parameters $\{w_{ni},b_{ni}\}$ as result. It should be noted that the method described by E. Tartaglione et al. may shut off some neurons 105 in the neural network 100 when all their connections 106, i.e. all their weights $w_{nij}$, are accidentally pruned. However, this phenomenon is a side effect, out of control from the cited method known in the art.

Figure 3:
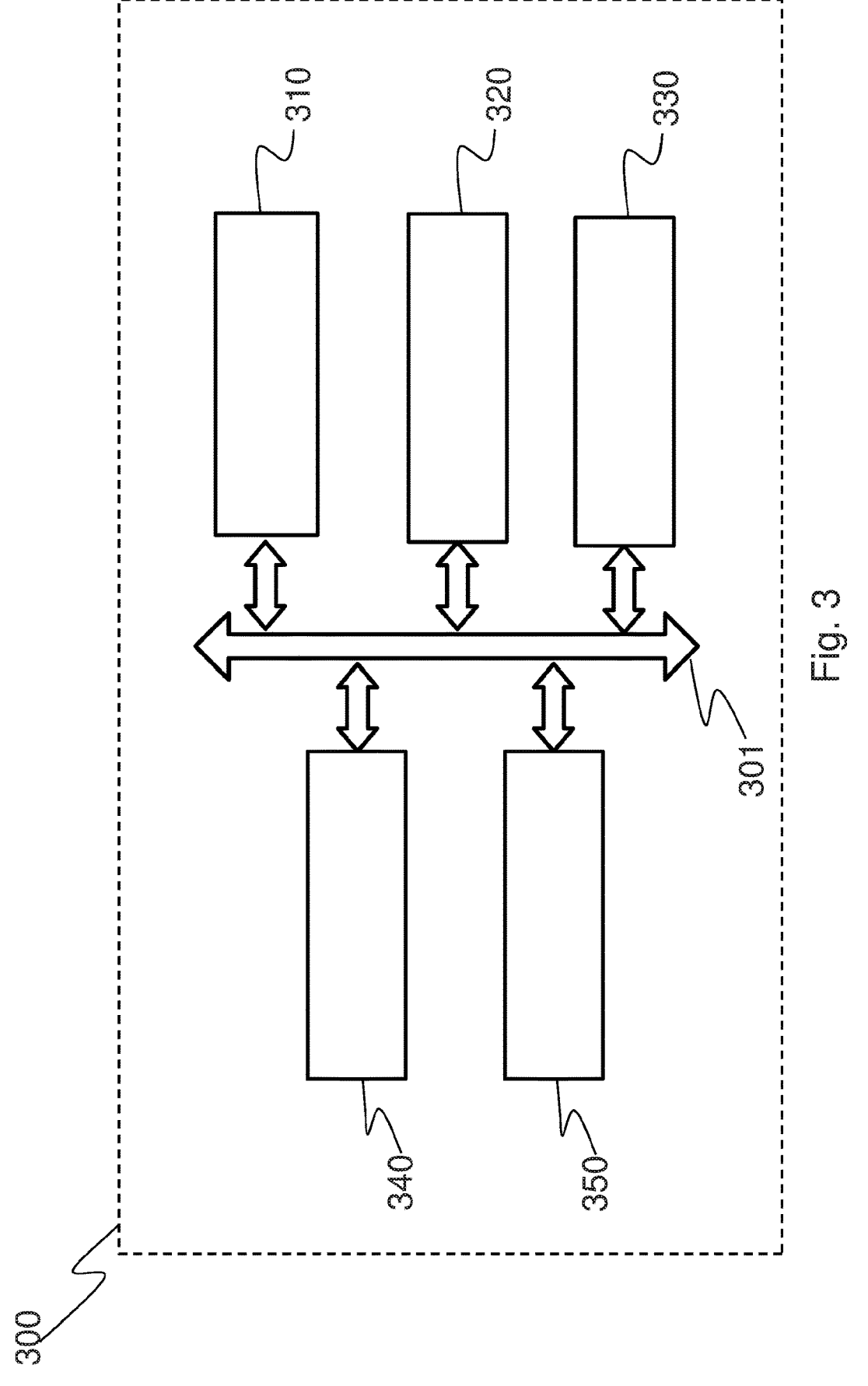

FIG. 3 illustrates a block diagram exemplifying an apparatus 300 for pruning the neural network 100, according to an embodiment of the present invention. Said apparatus 300 can comprise input means 310, memory means 320, communication means 330, output means 340 and processing means 350, which can be operatively connected as example through a communication bus 301 which allows the exchange information among said input means 310, memory means 320, communication means 330 and processing means 340. Alternatively, the input means 310, memory means 320, communication means 330, output means 340 and processing means 350 can be operatively connected by means of a star architecture, without said communication bus 301.

The input means 310 are adapted to read input information, such as data and/or instructions, from a user. Said input information can comprise as example the parameters $\{w_{ni}, b_{ni}\}$, the model M of said neural network 100, the dataset D, the first performance level A and a second performance level A* to be achieved by the resulting pruned neural network 200. Such input means 310 can comprise for example a keyboard, a touchscreen, a memory device and an interface according to USB, Bluetooth, Firewire, SATA, SCSI standards and so on so forth.

The memory means 320 are adapted to store information and the set of instructions for carrying out a method according to an embodiment of the present invention. Said method will be described in detail with reference to FIG. 4. The stored information can be related to the parameters $\{w_{ni}, b_{ni}\}$, the model M of said neural network 100, the dataset D, the first performance level A, the second performance level A*, and a pruned model M* of said resulting pruned neural network 200, which is obtained following the method for pruning the neural network 100. The pruned model M* comprises pruned parameters $\{w*_{ni},b*_{ni}\}$ as result of the method for pruning the neural network 100. Said pruned parameters $\{w*_{ni},b*_{ni}\}$ can be represented as sparse matrices, i.e. they have few non-zero entries. Furthermore, said sparse matrices are structured, i.e. their entries are not randomly distributed, this allows advantageously to compress effectively said pruned parameters $\{w*_{ni},b*_{ni}\}$. The compression of the pruned parameters $\{w*_{ni},b*_{ni}\}$ can be lossless or lossy according to any technique known in the art. For example, the pruned parameters $\{w*_{ni},b*_{ni}\}$ can be encoded by the arithmetic coding technique, in the case of lossless compression, or can be quantized by means a codebook in the case of lossy compression and so on so forth. FIG. 8 shows an example of a matrix 800 having 500×800 entries representing the weights vector $w*_{ni}$ of all neurons in a layer 110, 120, 130 arranged for example by rows, after the pruning procedure according to an embodiment of the present invention, wherein black dots represent non-zero weights and white dots represent zero weights. Such memory means 320 can comprise for example volatile and/or non-volatile memory units based on semiconductor-electronic and/or opto-electronic and/or magnetic technologies.

The communication means 330 are adapted to transmit information related to the pruned model M* to another apparatus such as a laptop, a smartphone, a remote server and so on so forth. Said information related to the pruned model M* can be for example the pruned parameters $\{w*_{ni}, b*_{ni}\}$ obtained following the method described by the present invention. Such communication means 330 can comprise for example a transceiver according to Wi-Fi, GSM, LTE, Ethernet standards and so on so forth.

The output means 340 are adapted to provide output information, such as processed data, to said user. Said processed data can comprise as example the pruned parameters $\{w*_{ni},b*_{ni}\}$ and/or the pruned model M* of said resulting pruned neural network 200. Such output means 340 can comprise for example a screen, a touchscreen, a memory device and an interface according to USB, Bluetooth, Firewire, SATA, SCSI standards and so on so forth.

The processing means 350 are adapted to process the data and to execute the set of instructions stored by the memory means 320. Such processing means 340 can comprise for example a Central Processing Unit (CPU) based on ARM architecture or X64 architecture and/or a Graphical Processing Unit (GPU). Such processing means 340 can be for example implemented by a microcontroller like Arduino or can be implemented by dedicated hardware components such as CPLD, FPGA, or can be implemented by purpose-built chipsets such as Intel Nervana Neural Network Processor, or the like. The processing means 350 can control the operations performed by the input means 310, memory means 320, communication means 330 and output means 340.

Besides, the block diagram shown in FIG. 3 is of exemplificative nature only; it allows to understand how the invention works and how it can be realized by the person skilled in the art. The person skilled in the art understands that these charts have no limitative meaning in the sense that functions, interrelations and information shown therein can be arranged in many equivalents ways; for example, operations appearing to be performed by different logical blocks can be performed by any combination of hardware and software resources, being also the same resources for realizing different or all blocks.

Figure 4:
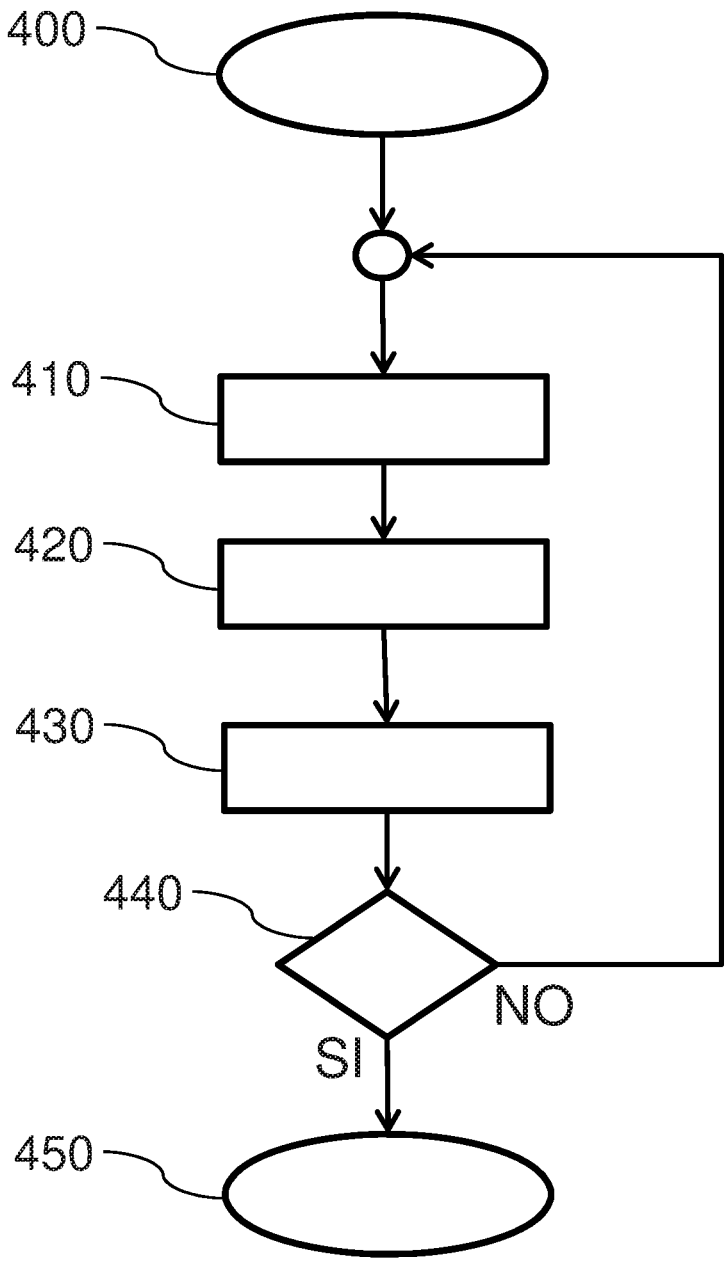
FIG. 4 shows a flow chart exemplifying a method for pruning neural networks, according to an embodiment of the present invention.

With reference to FIG. 4, a method for pruning the neural network 100 is described, with reference to the block diagram of FIG. 3.

At step 400 an initialization phase is performed by said processing means 350. During this phase, the processing means 350 fetch said input information which can be already stored by the memory means 320 or can be retrieved by said input means 310, and then stored by the memory means 320. Said input information can comprise the parameters $\{w_{ni}, b_{ni}\}$ related to the neural network 100, the model M of said neural network 100, the dataset D, representative of a task that the neural network 100 has to deal with, and the second performance level A* to be achieved by the resulting pruned neural network 200. The parameters $\{w_{ni},b_{ni}\}$ can comprise the weights vector $w_{ni}$ and/or the bias $b_{ni}$ related to at least one neuron 105, labelled as $x_{ni}$.

In a preferred embodiment of the present invention, said input information can comprise said parameters $\{w_{ni},b_{ni}\}$ which are already trained according to any technique known in the art, such as the Gradient Descent algorithm.

At step 410 a splitting phase is performed by said processing means 350. During this phase, the processing means 350 generate a partition of said dataset D, in order to obtain a second training set U' and a second validation set V' usually disjointed from each other, which can be stored by said memory means 320. Said second training set U' and second validation set V' can be preferably generated randomly, for example the dataset D can be randomly sampled.

At step 420 a regularization phase is performed by said processing means 350. During this phase, the processing means 350 train the neural network 100, i.e. train the model M, according to a training algorithm by using the dataset D. For example, the training can be performed by said Gradient Descent algorithm by using the second training set U'. During this phase, the parameters $\{w_{ni}, b_{ni}\}$ evolve, from learning epoch t to epoch t+1, according to a regularized update rule based on a neural sensitivity measure S to drive towards zero the parameters related to at least one less sensitive neuron 108 of the neural network 100. The neural sensitivity measure S is based on a pre-activation signal, i.e. the input value of the activation function $g_{ni}$, of at least one neuron 105 of the neural network 100. The pre-activation signal can depend on the input values vector $Y_{n-1}$ and the parameters $\{w_{ni}, b_{ni}\}$ of the neuron 105, labelled as $x_{ni}$. This allows, in the following step 430, to prune at least one less sensitive neuron 108, i.e. to put at zero all its related parameters, such as its bias $b_{ni}$ and its weights vector $w_{ni}$, which can be represented by the connections 107.

Said regularized update rule can drive toward zero the weights vector $w_{ni}$, i.e. all the weights $w_{nij}$, related to at least one less sensitive neuron 108; the regularized update rule can be written for example as in the following relation $$w_{nij}^{t+1} = w_{nij}^t - \eta \frac{\partial L}{\partial w_{nij}^t} - \lambda w_{nij}^t \overline{S}_{ni}; \eta, \lambda \in [0, +\infty). \tag{4}$$

The first and the second term of the regularized update rule (4) correspond to the update rule known in the art, whereas the third term corresponds to a penalty term applied to the weight $w_{nij}$ belonging to the neuron 105, labelled as $x_{ni}$. Said penalty term is proportional to a neural insensitivity measure $\overline{S}_{ni}$, referred to the neuron 105, labelled as $x_{ni}$, which can be defined as the complementary of said neural sensitivity measure $S_{ni}$, referred to said neuron 105, labelled as $x_{ni}$. Therefore, said neural insensitivity measure $\overline{S}_{ni}$ can be written for example as in the following relation $$\overline{S}_{ni} = \max\{0, 1-S_{ni}\}; \overline{S}_{ni} \in [0,1]. \tag{5}$$

The neural sensitivity measure $S_{ni}$ is defined in order to evaluate whether neuron 105, labelled as $x_{ni}$, shall be pruned from the neural network 100. To this end, the neural sensitivity measure $S_{ni}$, referred to the neuron 105 labelled as $x_{ni}$, is based on the pre-activation signal of the neuron 105, labelled as $x_{ni}$, that can depend on its input values vector $Y_{n-1}$ and its parameters $\{w_{ni}, b_{ni}\}$. The pre-activation signal of the neuron 105, labelled as $x_{ni}$, can be determined by a post-synaptic potential function $p_{ni}$ of said neuron 105, labelled as $x_{ni}$, given its input values vector $Y_{n-1}$ and its parameters $\{w_{ni}, b_{ni}\}$. The post-synaptic potential function $p_{ni}(\cdot)$ can be written for example as the following relation $$p_{ni} = f_{ni}(\{w_{ni}, b_{ni}\}; Y_{n-1}). \tag{6}$$

Therefore, said neural sensitivity measure $S_{ni}$ of the neuron 105, labelled as $x_{ni}$, can be written for example as the following relation $$S_{ni}(Y_N, p_{ni}) = \frac{1}{x_N} \Sigma_{j=1}^{x_N} \left| \frac{\partial y_{Nj}}{\partial p_{ni}} \right|; S_{ni} \in [0, +\infty). \tag{7}$$

Such definition allows to evaluate what is the contribution of the neuron 105, labelled as $x_{ni}$, to the output $Y_N$ of the neural network 100, where $X_N$ is the number of the neurons 105 in the output layer 130, $y_{Nj}$ is the output of the j-th neuron 105 in the output layer 130 and $p_{ni}(\cdot)$ is said post-synaptic potential function of the neuron 105, labelled as $x_{ni}$.

When the neural sensitivity measure $S_{ni}$, referred to the neuron 105 labelled as $x_{ni}$, is small, i.e. $S_{ni} \to 0$, then said neuron 105, labelled as $x_{ni}$, yields a small contribution to the output $y_{Nj}$ of the j-th neuron 105 in the output layer 130, therefore its parameters is driven towards zero with little perturbation to the output of said neural network 100. Similarly, when the neural insensitivity measure $\overline{S}_{ni}$, referred to the neuron 105 labelled as $x_{ni}$, increases, i.e. $\overline{S}_{ni} \to 1$, it means that said neuron 105, labelled as $x_{ni}$, is not contributing to the output layer 130, thus its parameters can be driven towards zero, according to the regularized update rule shown as example in relation (4) above. Said regularized update rule can be performed iteratively for example together with a Gradient Descent algorithm.

According to the aims of the invention, this allows to prune in a second stage such less sensitive neurons 108 rather than single connections 106, i.e. the neuron parameters independently, therefore the resulting pruned neural network 200, with a structured sparsity, is obtained from said neural network 100.

In another embodiment of the invention a local regularized update rule can be performed instead of said regularized update rule as provided by relation (4). The neural sensitivity measure S, from definition (7), represents a measure of the global impact of a given neuron 105 in the output layer 130. Said definition considers all the previous neurons 105 involved in the computation. In this embodiment a definition of local neural sensitivity measure $\tilde{S}$ is provided which is based only on the pre-activation signal and the output signal of each neurons 105 individually.

Said local neural sensitivity measure $\tilde{S}_{ni}$ of the output $y_{ni}$ of the neuron 105, labelled as $x_{ni}$, with respect to its post-synaptic potential function $p_{ni}(\cdot)$ can be defined for example as the following relation $$\tilde{S}_{ni} = \left| \frac{\partial y_{ni}}{\partial p_{ni}} \right|; \tilde{S}_{ni} \in [0, +\infty). \tag{8}$$

In the case of rectified linear activation unit networks, also called ReLU-activated networks, the local neural sensitivity measure $\tilde{S}_{ni}$ is simply the Heaviside function $\theta(\cdot)$, therefore the local regularized update rule can be written as $$w_{nij}^{t+1} = w_{nij}^t - \eta \frac{\partial L}{\partial w_{nij}^t} - \lambda w_{nij}^t \theta(-p_{ni}); \eta, \lambda \in [0, +\infty). \tag{9}$$

Clearly the penalty term, the third one, is applied only in case the neuron 105 stays off. This represents a huge approximation to the neural sensitivity measure which reduces the computational complexity for the present invention.

At step 430 a thresholding phase is performed by said processing means 350. During this phase, the processing means 350 put at zero the parameters $\{w_{ni}, b_{ni}\}$ of the neural network 100. For example, an element $w_{nij}$ of the weights vector $w_{ni}$ can be put at zero when its absolute value is below a given threshold $T \in [0, +\infty)$. The value of the threshold T can be determined by increasing it from a minimum value $T_{min}$, for example by means of bisection approach, until the optimal value T* is reached, based on the performance of the model M. Said minimum value $T_{min}$ can be determined for example by taking the minimum of the entire set of the parameters $\{w_{ni}, b_{ni}\}$ of the model M. During this phase, the bias bin related to at least one neuron 105, labelled as $x_{ni}$, can be put at zero when its corresponding weights vector $w_{ni}$ is put at zero.

At step 440 a check phase is performed by said processing means 350. During this phase, the processing means 350 evaluate the performance of the neural network 100, i.e. of model M, over the first validation set V and/or the second validation set V'. The performance of the neural network 100, i.e. of model M, can be evaluated according to a predefined metric such as for example the loss function L. Next, the processing means 350 verify if the performance of the neural network 100, i.e. of model M, is greater than said second performance level A*. In the affirmative case, the processing means 350 execute step 410, while they execute step 450 otherwise.

At step 450 an output phase is performed by said processing means 350. During this phase, the processing means 350 provide as output said processed data such as the pruned parameters $\{w^*_{ni}, b^*_{ni}\}$ and/or the pruned model M* of the resulting pruned neural network 200. During this phase the processing means 350 can for example store said processed data to said memory means 320, and/or can provide output information related to said processed data to said user by said output means 340, and/or can transmit information related to said processed data to said device, such as a remote server, by said communication means 330.

With reference to FIG. 6, the results of performance tests conducted by the Applicant are going to be discussed.

In these tests a LeNet-5 neural network architecture was pruned according to an embodiment of the present invention and its performances have been evaluated. The tests were performed over Fashion-MNIST dataset proposed by H. Xiao, K. Rasul, and R. Vollgraf, in "*Fashion-mnist: a novel image dataset for benchmarking machine learning algorithms*", published in CoRR, vol. abs/1708.07747, 2017, available online at http://arxiv.org/abs/1708.07747. Such dataset has the same size of the MNIST dataset, yet it contains images of dresses, shoes, and so on so forth. Fashion-MNIST dataset is notoriously harder to classify than MNIST since the images are not as sparse as for MNIST.

The method according to an embodiment of the present invention was implemented in Python, using PyTorch 1.0.1 and over a RTX2080 NVIDIA GPU with 8 GB of memory. The training of the model was performed by using Stochastic Gradient Descent (SGD) technique with learning rate $\eta = 0.1$ over 20 learning epochs. SGD can be regarded as a stochastic approximation of Gradient Descent algorithm, since it replaces the actual gradient, calculated from the entire data set, by an estimate thereof calculated from a randomly selected subset of the data. For both the neural sensitivity measure and the local neural sensitivity measure was employed $\lambda = 10^{-5}$, in this case the required epochs to prune the tested LeNet-5 neural network were in the order of 2000.

The amount of the pruned parameters of the tested model was measured by the ratio $$\left( \frac{|\theta|}{|\theta_{\neq 0}|} \right)$$

between the number of parameters in the original network, not pruned at all, and the number of remaining parameters after applying the method according to an embodiment of the present invention. The number of remaining neurons, or filters for convolutional layers, after pruning are also reported.

Table 600 shows the ratio $$\frac{|\theta|}{|\theta_{\neq 0}|}$$

among the pruning techniques performed according to an embodiment of the present invention, lines 610, and the pruning technique performed according prior art, line 620.

The number of parameters pruned with both the neural sensitivity measure (Proposed-LB) and the local neural sensitivity measure (Proposed-local), are almost double with respect to the number of parameters pruned by prior art techniques (Tartaglione et al.). Most important to appreciate the merit of the present invention, observing the number of pruned neurons, Proposed-LB prunes more neurons than Proposed-local, and both prune more neurons than the reference Tartaglione et al. This is the effect of the global information coming from the neural sensitivity measure formulation compared to the local neural sensitivity measure formulation.

In conclusion, the obtained results show that the method described in the present invention can outperform the state-of-the-art pruning schemes both in terms of pruned parameters and pruned neurons.

The advantages of the present invention are therefore evident from the description provided above.

The method and an apparatus for pruning neural networks, according to the present invention, allows advantageously to learn compact network topologies by means of a regularization function based on a neuronal sensitivity measure which promotes sparse architectures with a structure.

A further benefit of the present invention is that it allows to obtain a very compact neural network with limited (or no) penalty in the learning task.

Another benefit of the present invention is that it can be advantageously applied to any neural network model, without any prescription.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method of pruning a neural network comprising a plurality of neurons, said method comprising:

an initialization phase, wherein input information is fetched, said input information comprising at least parameters ($\{w_{ni},b_{ni}\}$) related to said neural network and a dataset (D) representative of a task that said neural network has to deal with, wherein said parameters ($\{w_{ni},b_{ni}\}$) comprise one or more of a weights vector ($w_{ni}$) or a bias ($b_{ni}$) related to at least one neuron of said plurality of neurons;

a regularization phase, wherein said neural network is trained according to a training algorithm by using said dataset (D);

a thresholding phase, wherein an element ($w_{ni}$) of said weights vector ($w_{ni}$) is put at zero when its absolute value is below a given threshold (7), said method being characterized in that, during said regularization phase, said parameters ($\{w_{ni},b_{ni}\}$) evolve according to a regularized update rule based on a neural sensitivity measure (S) such that the neural network is pruned by being driven towards zero parameters related to at least one less sensitive neuron of said neural network, wherein said neural sensitivity measure (S) is based on a pre-activation signal of at least one neuron of said plurality of neurons.

2. The method of claim 1, wherein said pre-activation signal depends on an input values vector ($Y_{n-1}$) and the parameters ($\{w_{ni},b_{ni}\}$) of said at least one neuron.

3. The method of claim 1, wherein said regularized update rule drives toward zero the weights vector ($w_{ni}$) related to said at least one less sensitive neuron.

4. The method of claim 1, wherein said neural sensitivity measure (S) represents a measure of the global impact of a given neuron in an output layer of said neural network, wherein all the previous neurons are involved in the computation of said neural sensitivity measure (S).

5. The method of claim 1, wherein said neural sensitivity measure (S) is based only on said pre-activation signal and an output signal of each of said neurons individually.

6. The method of claim 1, wherein the value of said threshold (T) is determined by increasing it from a minimum value ($T_{min}$) until an optimal value (T*) is reached, wherein said minimum value ($T_{min}$) is determined by taking the minimum of the entire set of said parameters ($\{w_{ni},b_{ni}\}$).

7. The method of claim 1, wherein said bias ($b_{ni}$) related to at least one neuron is put at zero when its corresponding weights vector ($w_{ni}$) is put at zero.

8. The method of claim 1, wherein said training algorithm is the Gradient Descent algorithm or the Stochastic Gradient Descent algorithm.

9. The method of claim 1, further comprising an output phase wherein processed data, such as pruned parameters ($\{w^*_{ni},b^*_{ni}\}$) and/or pruned model (M*) of a resulting pruned neural network, are provided as output.

10. The method of claim 9, wherein said processed data are transmitted to a device.

11. An apparatus for pruning a neural network comprising a plurality of neurons, said apparatus comprising a processor and a memory storing instructions that, when executed by the processor, cause the processor to perform operations, the operations comprising:

an initialization phase, wherein input information is fetched and said input information comprises at least parameters ($\{w_{ni},b_{ni}\}$) related to said neural network, a dataset (D) representative of a task that said neural network has to deal with, wherein said parameters ($\{w_{ni},b_{ni}\}$) comprise one or more of a weights vector ($w_{ni}$) or a bias ($b_{ni}$) related to at least one neuron of said plurality of neurons;

a regularization phase, wherein said neural network is trained according to a training algorithm by using said dataset (D);

a thresholding phase, wherein an element ($w_{ni}$) of said weights vector ($w_{ni}$) is put at zero when its absolute value is below a given threshold (T), said apparatus being characterized in that, during said regularization phase, said parameters ($\{w_{ni},b_{ni}\}$) evolve according to a regularized update rule based on a neural sensitivity measure (S) such that the neural network is pruned by being driven towards zero parameters related to at least one less sensitive neuron of said neural network, wherein said neural sensitivity measure (S) is based on a pre-activation signal of at least one neuron of said plurality of neurons.

12. The apparatus of claim 11, wherein said pre-activation signal depends on an input values vector ($Y_{n-1}$) and the parameters ($\{w_{ni},b_{ni}\}$) of said at least one neuron.

13. The apparatus of claim 11, wherein said regularized update rule drives toward zero the weights vector ($w_{ni}$) related to said at least one less sensitive neuron.

14. The apparatus of claim 11, wherein said neural sensitivity measure (S) represents a measure of the global impact of a given neuron in an output layer of said neural network, wherein all the previous neurons are involved in the computation of said neural sensitivity measure (S).

15. The apparatus of claim 11, wherein said neural sensitivity measure (S) is based only on said pre-activation signal and an output signal of each of said neuron individually.

16. The apparatus of claim 11, wherein the value of said threshold (T) is determined by increasing it from a minimum value ($T_{min}$) until an optimal value (T*) is reached, wherein said minimum value ($T_{min}$) is determined by taking the minimum of the entire set of said parameters ($\{w_{ni},b_{ni}\}$).

17. The apparatus of claim 11, wherein said bias ($b_{ni}$) related to at least one neuron is put at zero when its corresponding weights vector ($w_{ni}$) is put at zero.

18. The apparatus of claim 11, wherein said training algorithm is the Gradient Descent algorithm or the Stochastic Gradient Descent algorithm.

19. The apparatus of claim 11, comprising an output phase wherein processed data, such as pruned parameters $\{\{w^*_{ni}, b^*_{ni}\}\}$ and/or pruned model (M*) of a resulting pruned neural network, are provided as output.

20. The apparatus of claim 19, wherein said processed data are transmitted to a device.

* * * * *